United States Patent
Li et al.

(10) Patent No.: US 12,411,514 B2
(45) Date of Patent: Sep. 9, 2025

(54) TRIGGER MODULE WITH FORCE FEEDBACK

(71) Applicants: AAC ACOUSTIC TECHNOLOGIES (SHENZHEN) CO., LTD., Shenzhen (CN); AAC Microtech (Changzhou) Co., Ltd., Changzhou (CN)

(72) Inventors: Yuntong Li, Shenzhen (CN); Bing Xie, Shenzhen (CN); Lijin Zhang, Shenzhen (CN)

(73) Assignees: AAC ACOUSTIC TECHNOLOGIES (SHENZHEN) CO., LTD., Shenzhen (CN); AAC Microtech (Changzhou) Co., Ltd., Changzhou (CN)

( * ) Notice: Subject to any disclaimer, the term of this patent is extended or adjusted under 35 U.S.C. 154(b) by 0 days.

(21) Appl. No.: 17/914,782

(22) PCT Filed: Apr. 26, 2022

(86) PCT No.: PCT/CN2022/089226
§ 371 (c)(1),
(2) Date: May 27, 2024

(87) PCT Pub. No.: WO2023/197376
PCT Pub. Date: Oct. 19, 2023

(65) Prior Publication Data
US 2024/0393821 A1    Nov. 28, 2024

(30) Foreign Application Priority Data

Apr. 12, 2022   (CN) .......................... 202220840600.9

(51) Int. Cl.
*G05G 1/04*      (2006.01)
*A63F 13/24*     (2014.01)
(Continued)

(52) U.S. Cl.
CPC ............... *G05G 1/04* (2013.01); *A63F 13/24* (2014.09); *A63F 13/285* (2014.09); *G05G 5/03* (2013.01); *G05G 2505/00* (2013.01)

(58) Field of Classification Search
CPC .. G05G 1/04; G05G 5/03; G05G 5/05; G05G 9/047; G05G 2505/00; A63F 13/24; A63F 13/285
See application file for complete search history.

(56) References Cited

U.S. PATENT DOCUMENTS 10,773,159 B2 *   9/2020   Schmitz ................ A63F 13/285
12,079,024 B2 *   9/2024   Li ............................ G05G 5/03
(Continued)

FOREIGN PATENT DOCUMENTS

CN       113082690 A  *  7/2021  ........... A63F 13/218
CN       113209605 A  *  8/2021  ............. A63F 13/24
(Continued)

OTHER PUBLICATIONS

Machine translation of CN 113082690 A obtained on Mar. 5, 2025.*

*Primary Examiner* — Adam D Rogers
(74) *Attorney, Agent, or Firm* — Wiersch Law Group

(57) ABSTRACT

A trigger module with force feedback includes a housing including an installation groove; a trigger swing bar rotatably connected to the housing; and a transmission device connected to the trigger swing bar. the transmission device includes a one-way transmission module engaged with the trigger swing bar, a driving module connected to the one-way transmission module and installed in the installation groove, and a driving member configured to drive the driving module. The driving member is connected to the driving module and installed in the housing; and the one-way transmission module includes two ends connected to the driving module and the trigger swing bar respectively. The trigger swing bar will not drive the driving member to (Continued)

reverse or drag the driving member when the trigger swing bar returns. Therefore, the trigger swing bar can quickly return, thereby providing users with good gaming experiences.

9 Claims, 9 Drawing Sheets

(51) Int. Cl.
  *A63F 13/28* (2014.01)
  *A63F 13/285* (2014.01)
  *G05G 5/03* (2008.04)

(56) References Cited

U.S. PATENT DOCUMENTS

| | | | | |
|---|---|---|---|---|
| 12,090,392 | B2 * | 9/2024 | Morita | A63F 13/285 |
| 12,186,655 | B2 * | 1/2025 | Jiang | A63F 13/24 |
| 12,222,742 | B2 * | 2/2025 | Li | G05G 5/03 |
| 2023/0400926 | A1 * | 12/2023 | Warner | G06F 3/016 |
| 2024/0029971 | A1 * | 1/2024 | Yokotsuka | H01H 21/36 |

FOREIGN PATENT DOCUMENTS

| | | | | | |
|---|---|---|---|---|---|
| CN | 214956567 | U | * | 11/2021 | |
| CN | 113972086 | A | * | 1/2022 | |
| CN | 215496419 | U | * | 1/2022 | |
| CN | 215962111 | U | * | 3/2022 | |
| CN | 218975323 | U | * | 5/2023 | |
| CN | 220609067 | U | * | 3/2024 | |
| CN | 118001714 | A | * | 5/2024 | |
| WO | WO-2023244624 | A1 | * | 12/2023 | A63F 13/218 |

* cited by examiner

TRIGGER MODULE WITH FORCE FEEDBACK

TECHNICAL FIELD

The present invention relates to the technical field of electronic device, and in particular, to a trigger module with force feedback.

BACKGROUND

With the development of network technology and electronic information technology, more and more game development, various operation handles, virtual reality devices, and augmented reality devices are developed, and users have higher and higher sensory requirements when using peripheral devices. In related art, the triggers of various handles or peripheral devices cannot be adjusted according to different game scenarios, and some triggers only provide certain vibration feedback, which is difficult to provide users with good gaming experiences and cannot provide users with immersive gaming experiences.

SUMMARY

An embodiment of the present invention provides a trigger module with force feedback, including: a housing including an installation groove; a trigger swing bar rotatably connected to the housing; and a transmission device connected to the trigger swing bar. The transmission device includes a one-way transmission module engaged with the trigger swing bar, a driving module connected to the one-way transmission module, and a driving member configured to drive the driving module. The driving member is connected to the driving module and installed in the housing; the driving module is installed in the installation groove; and the one-way transmission module includes an end connected to the driving module, and another end engaged with the trigger swing bar.

As an improvement, the one-way transmission module includes: a fixed part connected to an end of the driving module, a first elastic piece connected to the fixed part, at least one ratchet tooth connected to an end of the first elastic piece away from the fixed part, and a ratchet wheel detachably engaged with the at least one ratchet tooth. An upper part of the ratchet wheel is engaged with the trigger swing bar, an end of the at least one ratchet tooth away from the ratchet wheel is connected to the fixed part, and the first elastic piece is configured to provide the at least one ratchet tooth with an elastic force towards the ratchet wheel.

As an improvement, the fixed part includes an accommodating groove for accommodating the at least one ratchet tooth, and the at least one ratchet tooth includes a body part connected into the accommodating groove and an engaging part arranged at an end of the body part, The engaging part is arranged in the accommodating groove.

As an improvement, the ratchet wheel includes first gear teeth that are unidirectionally engaged with the at least one ratchet tooth, and a side of the engaging part is at least partially engaged with a corresponding first gear tooth of the first gear teeth.

As an improvement, the first gear teeth include first engaging slopes spaced apart from each other about an axis of the ratchet wheel, and first guide surfaces each of which connects two adjacent first engaging slopes. The engaging part includes a second engaging slope matching the first engaging slope, and a second guide surface. The second guide surface includes an end connected to the second engaging slope and another end connected to the body part. An inclination angle is formed between the first engaging slope and the first guide surface.

As an improvement, the fixed part includes a limiting structure disposed in the accommodating groove. An end of the first elastic piece away from the at least one ratchet tooth is connected to the limiting structure.

As an improvement, the upper part of the ratchet wheel includes a toothed structure engaged with the trigger swing bar.

As an improvement, the trigger swing bar includes: a trigger detachably engaged with the one-way transmission module, a connecting shaft including an end mounted to the housing and another end connected to the trigger, and a second elastic piece sleeved on a periphery of the connecting shaft. The second elastic piece is arranged at the housing and configured to provide an elastic force to reset the trigger.

As an improvement, the trigger includes: a connecting part engaged with the one-way transmission module, and a pressing part connected to the connecting part. A side of the connecting part connected to the one-way transmission module is provided with a gear structure engaged with the one-way transmission module.

As an improvement, the driving module includes a worm wheel connected to the one-way transmission module and a worm connected to the worm wheel in a transmission way. The worm and the worm wheel are arranged in the installation groove, and the worm penetrates the housing and then is connected to an output shaft of the driving member.

The beneficial effect of the present invention is as follows. A trigger module with force feedback is provided and includes the housing having the installation groove, the trigger swing bar rotatably connected to the housing, and the transmission device connected to the trigger swing bar; the transmission device includes the one-way transmission module engaged with the trigger swing bar, the driving module connected to the one-way transmission module, and the driving member configured to drive the driving module; the driving member is connected to the driving module and installed in the housing; the driving module is installed in the installation groove; and the one-way transmission module includes an end connected to the driving module, and another end engaged with the trigger swing bar. The force feedback trigger module provided by the present invention utilizes the driving member to drive the driving module to transmit the torque, and utilizes the one-way transmission module to unidirectionally transmit the torque to the trigger swing bar, that is, only a resistance for pressing the trigger swing bar is applied, and it can ensure that the trigger swing bar can be quickly reset after no pressing is applied on the trigger swing bar, the one-way transmission module can utilize the detachable engagement connection at the position where the one-way transmission module is engaged with the trigger swing bar and at the position where the one-way transmission module is connected to the driving module, to allow the trigger swing bar to be temporarily disengaged from the driving module when the trigger swing bar is reset. In this way, the trigger swing bar will not drive the driving member to reverse or drag the driving member when the trigger swing bar returns. Therefore, the trigger swing bar can quickly return, thereby providing users with good gaming experiences.

DESCRIPTION OF EMBODIMENTS

The present invention will be described below with reference to the accompanying drawings and embodiments.

Figure 1:
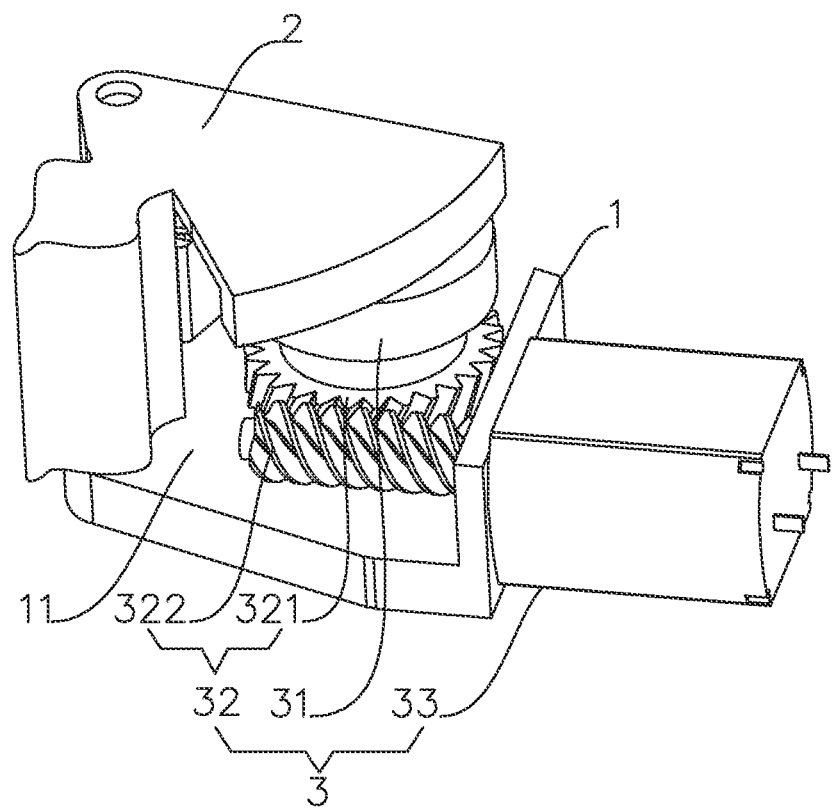
FIG. 1 is a schematic diagram of a trigger module with force feedback from a first angle provided by an embodiment of the present invention.
Figure 2:
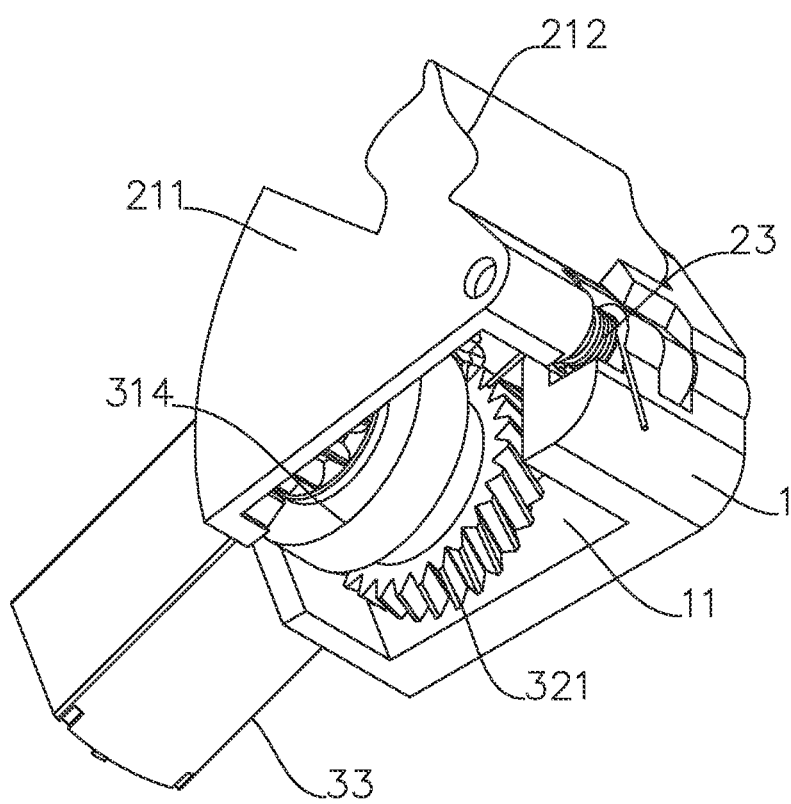
FIG. 2 is a schematic diagram of a trigger module with force feedback from a second angle provided by an embodiment of the present invention.

Referring to FIG. 1 and FIG. 2, an embodiment of the present invention provides a trigger module with force feedback, and the trigger module with force feedback includes a housing 1 having an installation groove 11, a trigger swing bar 2 rotatably connected to the housing 1, and a transmission device 3 connected to the trigger swing bar 2. The transmission device 3 includes a one-way transmission module 31 engaged with the trigger swing bar 2, a driving module 32 connected to the one-way transmission module 31, and a driving member 33 configured to drive the driving module 32. The driving member 33 is connected to the driving module 32 and installed to the housing 1, the driving module 33 is installed in the installation groove 11, and the one-way transmission module 31 includes one end connected to the driving module 32, and another end engaged with the trigger swing bar 2.

In this embodiment, the driving member 33 is used to drive the driving module 32 to transmit a torque, and the one-way transmission module 31 is used to unidirectionally transmit the torque to the trigger swing bar 2, that is, only a resistance for pressing the trigger swing bar 2 is applied, and it can ensure that the trigger swing bar 2 can be quickly reset after no pressing is applied, and the one-way transmission module 31 can utilize the detachable engagement connection at a position where the one-way transmission module 31 is engaged with the trigger swing bar 2 and at a position where the one-way transmission module 31 is connected to the driving module, to allow the trigger swing bar 2 to be temporarily disengaged from the driving module when the trigger swing bar is reset. In this way, the trigger swing bar 2 will not drive the driving member 33 to reverse or drag the driving member 33 when the trigger swing bar 2 returns. Therefore, the trigger swing bar 2 can quickly return, thereby providing users with good gaming experiences.

Further, the driving module 32 includes a worm wheel 321 connected to the one-way transmission module 31, and a worm 322 connected to the worm wheel 321 in a transmission manner. The worm wheel 321 and the worm 322 are installed in the installation groove 11, and the worm 322 penetrates the housing 1 and then is connected to an output shaft of the driving member 33.

In an embodiment, the driving member 33 is a motor. In order to save space and provide a better layout so that an axis of the motor is located in a rotation plane of the trigger swing bar 2, a transmission manner with the worm wheel and the worm is adopted, so that the transmission direction can be changed by 90 degrees, and at the same time, a larger reduction ratio can be obtained. The worm 322 is driven by the motor to rotate, the worm wheel 321 rotates with the worm 322, and a torque is transmitted by the one-way transmission module 31 to the trigger swing bar 2. The transmitted torque will produce a unidirectional pushing force on the trigger swing bar 2, and the pushing force acts as the resistance when the finger presses the trigger swing bar 2. By controlling the motor, the magnitude of the torque, the action period, and the action time can be changed, so as to achieve an ideal force feedback effect. As an improvement, the motor in some embodiments adopts a direct current (DC) motor. Since the driving module 32 and the one-way transmission module 31 have a large transmission ratio, a DC motor with a high speed and a low torque can obtain a large torque after transmission. With the one-way transmission module 31, the torque of the DC motor can be unidirectionally transmitted to the trigger swing bar 2, that is, only a resistance for pressing the trigger swing bar 2 is applied, and it can ensure that the trigger swing bar 2 can be quickly reset after no pressing is applied. Since the one-way transmission module 31 can be temporarily disengaged from the trigger swing bar 2 when the trigger swing bar 2 is reset, the trigger swing bar 2 will not drive the motor to reverse or drag the motor when the trigger swing bar 2 returns. Therefore, the trigger swing bar 2 can quickly return. Due to the reduction ratio and the internal resistance of the motor, if the one-way transmission module 31 is not provided, when the trigger swing bar 2 is pressed and then is released, the reset process of the trigger swing bar 2 will be subject to the resistance of the driving module 32, the one-way transmission module 31 and the motor, as a result, the reset process becomes slow, which affects the trigger swing bar 2.

Further, referring to FIG. 1 to FIG. 9, the one-way transmission module 31 includes a fixed part 311 connected to an end of the driving module 32, a first elastic piece 312 connected to the fixed part 311, a ratchet tooth 313 connected to an end of the first elastic piece 312 away from the fixed part 311, and a ratchet wheel 314 detachably engaged with the ratchet tooth 313. An upper part of the ratchet wheel 314 is detachably engaged with the trigger swing bar 2, and an end of the ratchet tooth 313 away from the ratchet wheel 314 is connected to the fixed part 311. The first elastic piece 312 is configured to provide the ratchet tooth 313 with an elastic force towards the ratchet wheel 314. The fixed part 311 has an accommodating groove 3111 for accommodating the ratchet tooth 313, and the ratchet tooth 313 includes a body part 3131 connected into the accommodating groove 3111 and an engaging part 3132 provided at an end of the body part 3131. The engaging part 3132 is arranged in the accommodating groove 3111. The ratchet wheel 314 includes first gear teeth 3141 unidirectionally engaged with a connection side of the ratchet teeth 313. A side of the engaging part 3132 is at least partially engaged with a corresponding first gear tooth 3141. The first gear teeth 3141 include first engaging slopes 31411 spaced apart from each other about an axis of the ratchet wheel 314, and first guide surfaces 31412 each of which connects two adjacent first engaging slopes 31411. The engaging part 3132 has a second engaging slope 31321 matching the first engaging slope 31411, and a second guide surface 31322. The second guide surface 31322 includes an end connected to the second engaging slope 31321 and another end connected to the body part 3131. An inclination angle is formed between the first engaging slope 31411 and the first guide surface 31412.

In some embodiments, the structure of the one-way transmission module 31 adopts the transmission mode of a single row of the ratchet teeth 313 and a single row of ratchet wheel 314. The fixed part 311 and the worm wheel 321 are fixed to each other or formed into one piece. The first elastic piece 312 is fixed to the fixed part 311, and another end of the first elastic piece 312 acts on the ratchet teeth 313. The ratchet teeth 313 can make an end of the first elastic piece 312 rotate about the axis of the fixed portion 311, and in a natural state, the first elastic piece 312 acts on the ratchet teeth 313 so that the ratchet teeth 313 are engaged with the first gear teeth 3141 on the ratchet wheel 314. An end of the ratchet wheel 314 away from the ratchet tooth 313 is engaged with the trigger swing bar 2. When the fixed part 311 rotates clockwise with the worm wheel 321, the ratchet teeth 313 is engaged with the ratchet wheel 314, and at this time, the ratchet wheel 314 rotates synchronously with the fixed part 311, in this case, torque can be transmitted. When the fixed part 311 rotates counterclockwise, the ratchet teeth 313 on the fixed part 311 is engaged with the ratchet wheel 314 due to the tooth-shaped structure of the ratchet wheel 314, and at this time, the fixed part 311 rotates and the ratchet wheel 314 does not rotate. Similarly, when the ratchet wheel 314 rotates clockwise, due to the tooth-shaped structure of the ratchet teeth 313 and the tooth-shaped structure of the ratchet wheel 314, the ratchet wheel 314 will not drive the fixed part 311 to rotate, so the transmission of the worm wheel 321 and the worm 322 and the motor will not be affected, thereby making the trigger swing bar 2 quickly return.

The body part 3131 and the engaging part 3132 of the ratchet tooth 313 are arranged in the accommodating groove 3111, so that the ratchet tooth 313 can rotate in the corresponding position, the body part 3131 is connected to the fixed part 311, and the engaging part 3132 rotate in the accommodating groove 3111 to drive the ratchet wheel 314 to rotate in the engaging state. An inclination angle is formed between the first engaging slope 31411 and the first guide surface 31412. When the fixed part 311 rotates clockwise with the worm wheel 321, due to that a side of the engaging part 3132 is at least partially located in the first gear tooth 3141, the first engaging surface abuts against and is engaged with the second engaging surface, and since the ratchet tooth 313 is fixed to the fixed part, the fixed part 311 can drive the ratchet wheel 314 to rotate synchronously at this time. When the fixed part 311 rotates counterclockwise, the first guide surface 31412 will be squeezed to the second guide surface 31322, and the first elastic piece 312 is compressed, so the engaging part 3132 cannot be engaged with the first gear tooth 3141, thereby ensuring that the fixed part 311 rotates and the ratchet wheel 314 does not rotate, or the ratchet wheel 314 will not drive the fixed part 311 to rotate, so the transmission of the worm wheel 321 and the worm 322 and the motor will not be affected, thereby making the trigger swing bar 2 quickly return.

Figure 3:
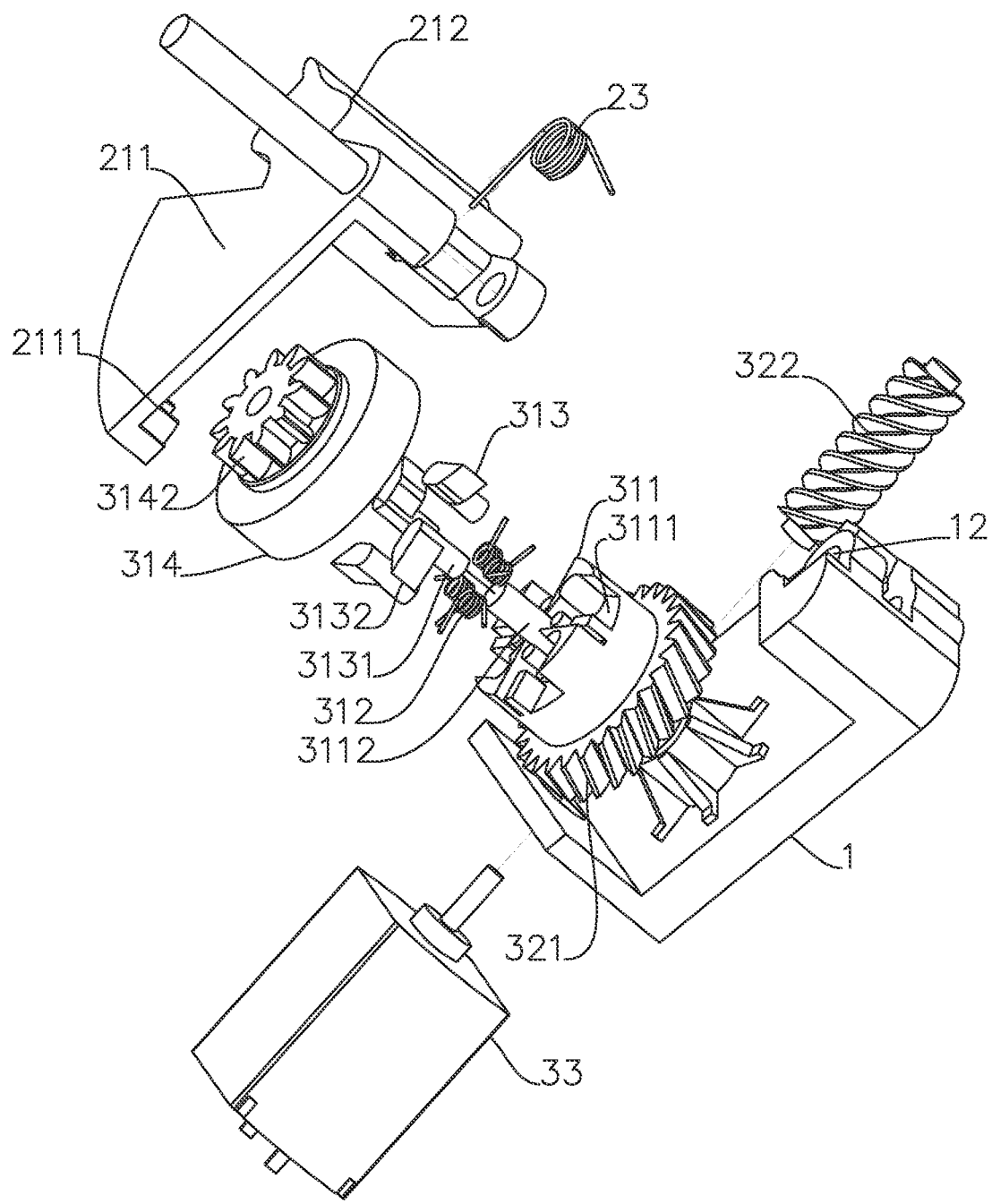
FIG. 3 is an exploded diagram of a trigger module with force feedback from a first angle provided by an embodiment of the present invention.
Figure 4:
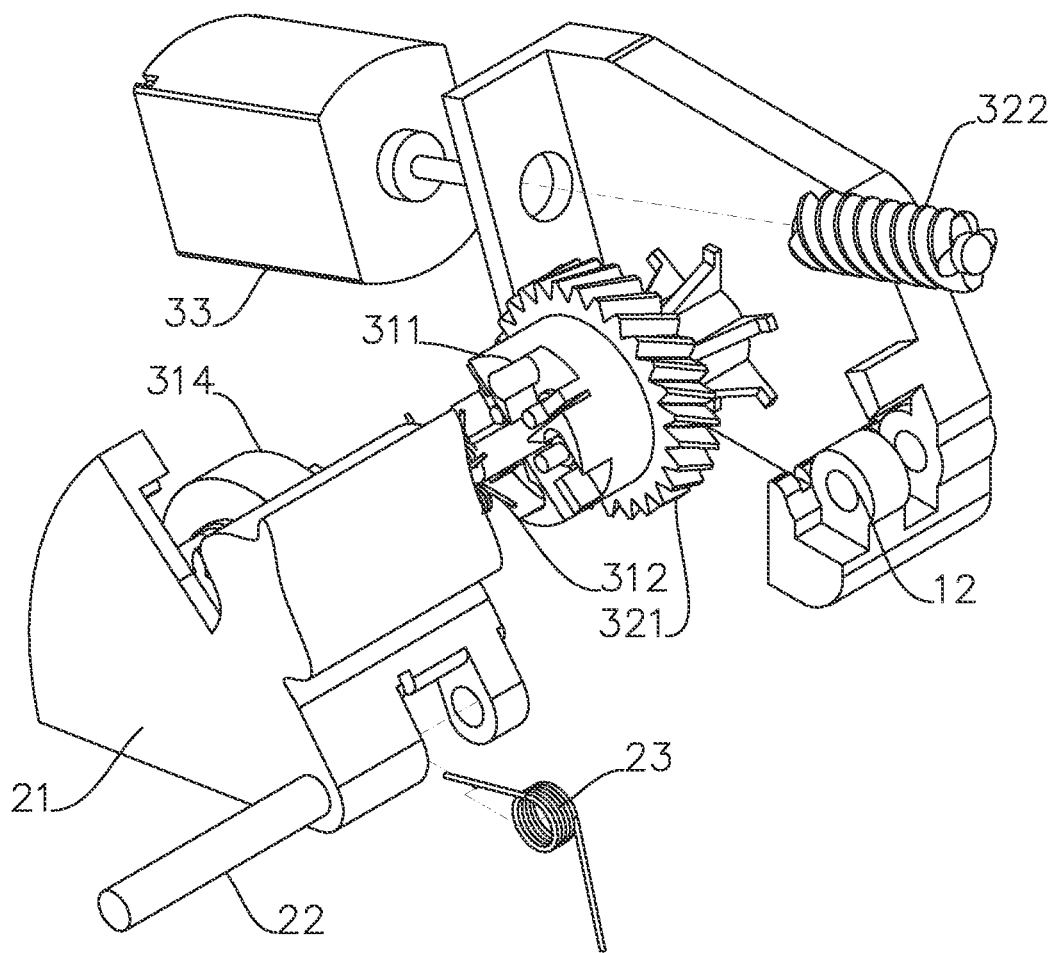
FIG. 4 is an exploded diagram of a trigger module with force feedback from a second angle provided by an embodiment of the present invention.
Figure 5:
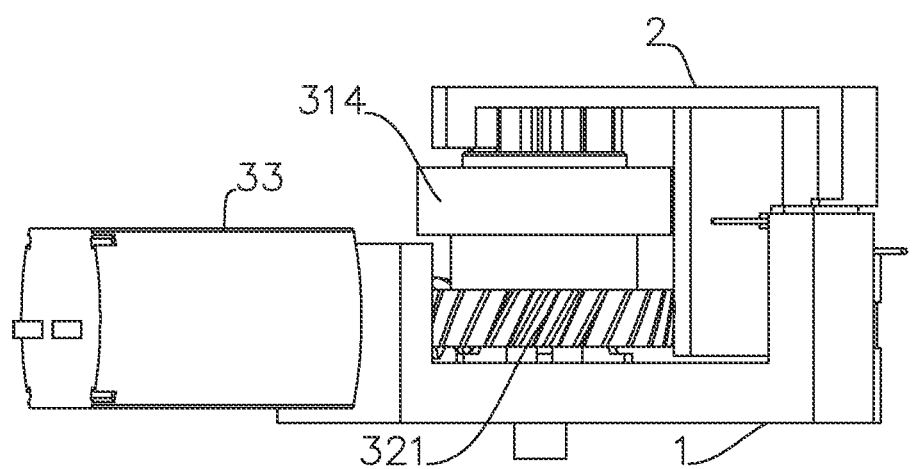
FIG. 5 is a side view of a trigger module with force feedback provided by an embodiment of the present invention.

Further, referring to FIG. 3, the fixed part 311 has a limiting structure 3112 disposed in the accommodating groove 3111, and an end of the first elastic piece 312 away from the ratchet teeth 313 is connected to the limiting structure 3112.

In the embodiments, the fixed part 311 is provided with a limiting structure 3112 corresponding to the first elastic piece 312, so that the first elastic piece 312 is limited, and a force supplied on the ratchet tooth 313 towards the ratchet wheel 314 is continuously supplied. The force does not need to be too large, which may easily increase the frictional force relative to the ratchet wheel 314. In some embodiments, the first elastic piece 312 adopts a torsion spring. There may be one or more evenly distributed combinations, and each combination includes the ratchet tooth 313 and the torsion spring. In some embodiments, there are four combinations each formed by the ratchet tooth 313 and the torsion spring, and the four combinations are arranged at equal angular intervals about the axis of the fixed part 311. In other embodiments, the first elastic piece 312 can be a spring, and the number of the combinations each formed by the ratchet tooth 313 and the spring may be 2, 3, 5, or more.

Figure 6:
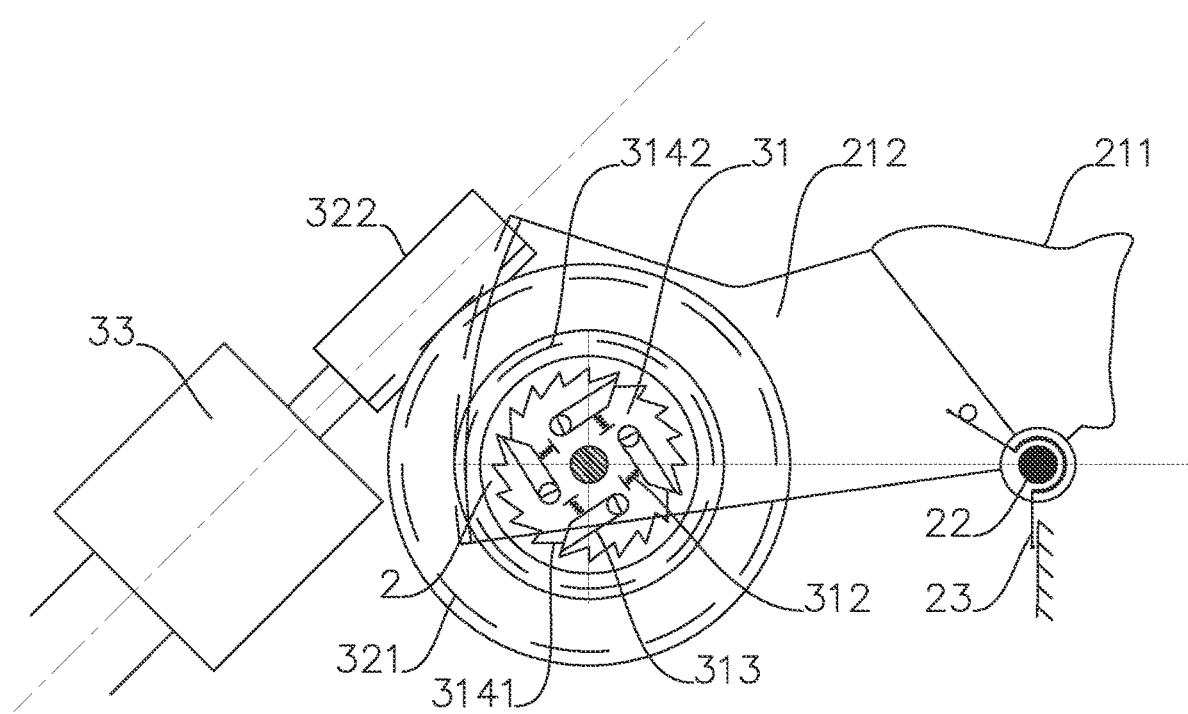
FIG. 6 is a schematic plan view of a trigger module with force feedback from a first angle provided by an embodiment of the present invention.
Figure 7:
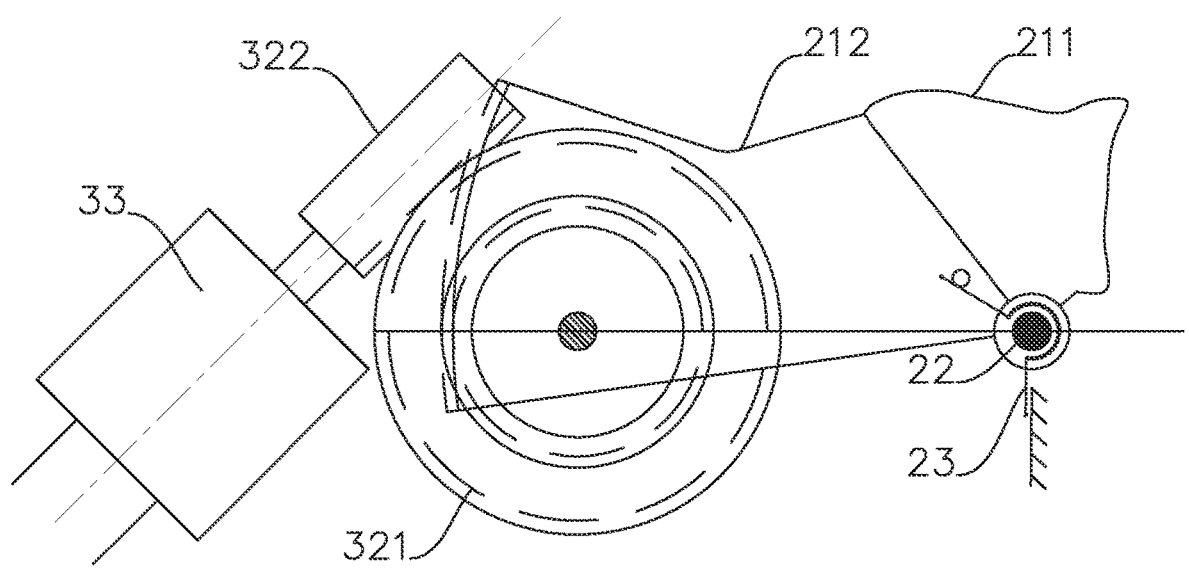
FIG. 7 is a schematic plan view of a trigger module with force feedback from a second angle provided by an embodiment of the present invention.
Figure 8:
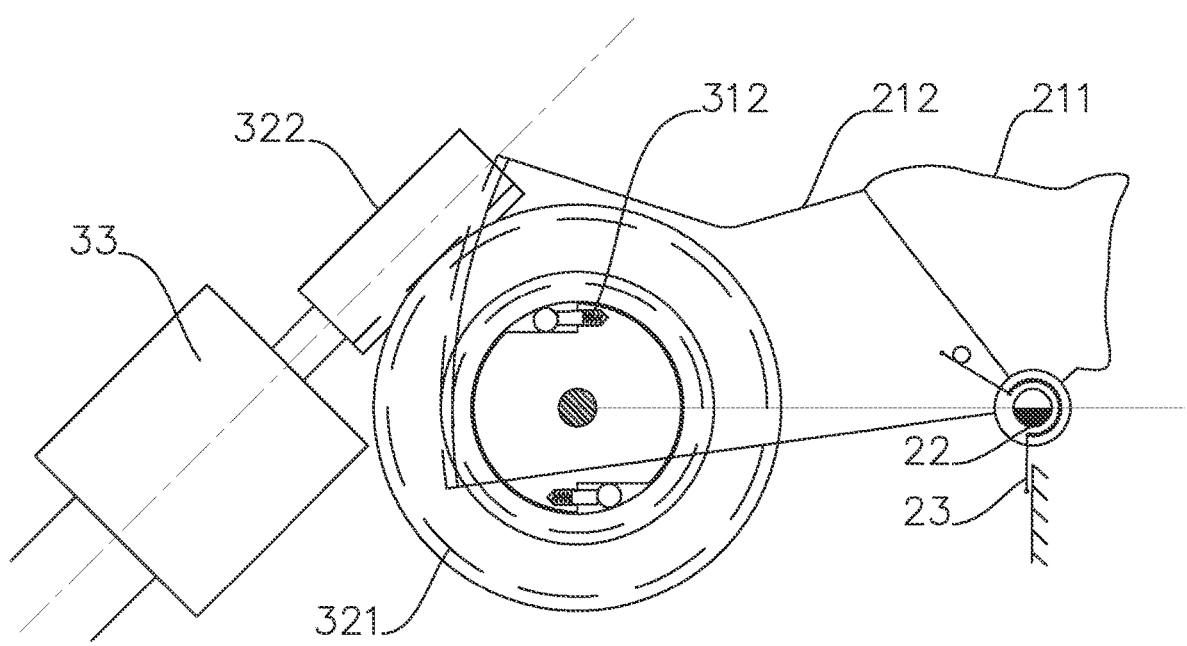
FIG. 8 is a schematic plan view of a trigger module with force feedback from a third angle provided by an embodiment of the present invention.
Figure 9:
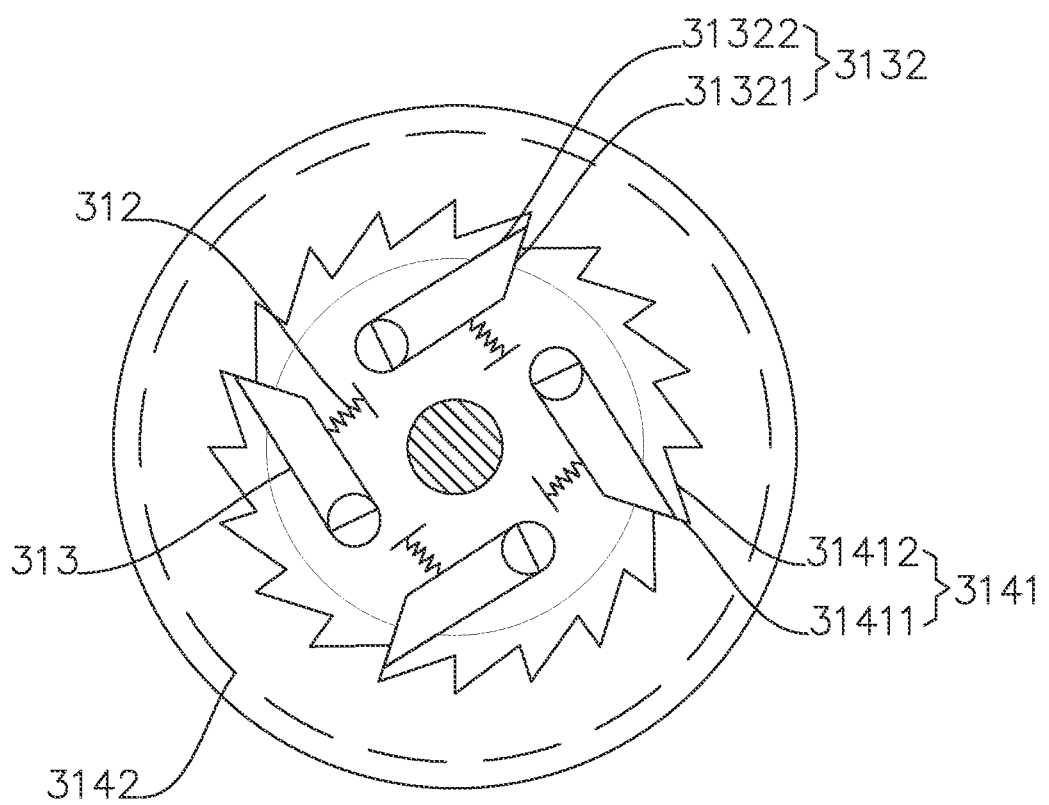
FIG. 9 is a schematic plan view of a one-way transmission module provided by an embodiment of the present invention.

Further, referring to FIG. 6 and FIG. 9, the upper part of the ratchet wheel 314 has a toothed structure 3142 engaged with the trigger swing bar 2.

In some embodiments, the toothed structure 3142 of the ratchet wheel 314 at an end of ratchet wheel 314 away from the ratchet tooth 313 is a pinion, which can be engaged with the trigger swing bar 2. When pressing the trigger swing bar 2, the driving member 33 can rotate to supply a force, for resisting the pressing by the finger, on the trigger swing bar 2 through the driving module 32 and the one-way transmission module 31. When the trigger swing bar 2 is released, a direction of the trigger swing bar 2 is rotated by the torsion spring, and in this case, the ratchet wheel 314 rotates but does not drive the fixed part 311 to rotate, that is, not drag the driving member 33.

Further, the trigger swing bar 2 includes a trigger 21 detachably engaged with the one-way transmission module 31, a connecting shaft 22 including an end mounted to the housing 1 and another end connected to the trigger 21, and a second elastic piece 23 sleeved on a periphery of the connecting shaft 22. The second elastic piece 23 is arranged at the housing 1, and the second elastic piece 23 is configured to provide an elastic force to reset the trigger 21. The trigger 21 includes a connecting part 211 detachably engaged with the one-way transmission module, and a pressing part 212 connected to the connecting part 211. A side of the connecting part connected to the one-way transmission module 31 has a gear structure 2111 detachably engaged with the one-way transmission module.

In the embodiments, the trigger 21 includes the connecting part 211 and the pressing part 212, the pressing part 212 is a finger pressing part, and the connecting part 211 is a part having a toothed shape and engaged with the tooth structure 3142. The housing 1 is provided with an installation hole 12, the connecting shaft 22 passes through the connecting part 211 of the trigger 21 and is then rotatably connected to the installation hole 12. The second elastic piece 23 is sleeved on a periphery of the installation hole 12, and the second elastic piece 23 is arranged between the housing 1 and the connecting shaft 22 and is configured to provide a buffering force or rotational force. The connecting part 211 is provided with the gear structure 2111 matching the toothed structure 3142 and configured to detachably engage the connecting part 211 with the ratchet wheel 314. In some embodiments, the second elastic piece 23 adopts a torsion spring. In other embodiments, the second elastic piece 23 can also be a spring.

To sum up, the force feedback trigger module provided by the present invention utilizes the driving member to drive the driving module to transmit the torque, and utilizes the one-way transmission module to unidirectionally transmit the torque to the trigger swing bar, that is, only a resistance for pressing the trigger swing bar is applied, and it can ensure that the trigger swing bar can be quickly reset after no pressing is applied on the trigger swing bar, the one-way transmission module can utilize the detachable engagement connection at the position where the one-way transmission module is engaged with the trigger swing bar and at the position where the one-way transmission module is connected to the driving module, to allow the trigger swing bar to be temporarily disengaged from the driving module when the trigger swing bar is reset. In this way, the trigger swing bar will not drive the driving member to reverse or drag the driving member when the trigger swing bar returns. Therefore, the trigger swing bar can quickly return, thereby providing users with good gaming experiences.

The above illustrates only some embodiments of the present invention. It should be noted that for those of ordinary skill in the art, improvements can be made without departing from the inventive concept of the present invention, and all these improvements shall fall within a scope of the present invention.

What is claimed is:

1. A trigger module with force feedback, comprising:
a housing comprising an installation groove;
a trigger swing bar rotatably connected to the housing; and
a transmission device connected to the trigger swing bar, wherein the transmission device comprises a one-way transmission module engaged with the trigger swing bar, a driving module connected to the one-way transmission module, and a driving member configured to drive the driving module, wherein the driving member is connected to the driving module and installed in the housing; the driving module is installed in the installation groove; and the one-way transmission module comprises an end connected to the driving module, and another end engaged with the trigger swing bar;
wherein the one-way transmission module comprises a fixed part connected to an end of the driving module, a first elastic piece connected to the fixed part, at least one ratchet tooth connected to an end of the first elastic piece away from the fixed part, and a ratchet wheel detachably engaged with the at least one ratchet tooth;
an upper part of the ratchet wheel is engaged with the trigger swing bar, an end of the at least one ratchet tooth away from the ratchet wheel is connected to the fixed part, and the first elastic piece is configured to provide the at least one ratchet tooth with an elastic force towards the ratchet wheel.

2. The trigger module with force feedback as described in claim 1, wherein the fixed part comprises an accommodating groove for accommodating the at least one ratchet tooth, and the at least one ratchet tooth comprises a body part connected into the accommodating groove and an engaging part arranged at an end of the body part, wherein the engaging part is arranged in the accommodating groove.

3. The trigger module with force feedback as described in claim 2, wherein the ratchet wheel comprises first gear teeth that are unidirectionally engaged with the at least one ratchet tooth, and a side of the engaging part is at least partially engaged with a corresponding first gear tooth of the first gear teeth.

4. The trigger module with force feedback as described in claim 3, wherein the first gear teeth comprise first engaging slopes spaced apart from each other about an axis of the ratchet wheel, and first guide surfaces each of which connects two adjacent first engaging slopes, wherein the engaging part comprises a second engaging slope matching the first engaging slope, and a second guide surface, wherein the second guide surface comprises an end connected to the second engaging slope and another end connected to the body part; and wherein an inclination angle is formed between the first engaging slope and the first guide surface.

5. The trigger module with force feedback as described in claim 2, wherein the fixed part comprises a limiting structure disposed in the accommodating groove, wherein an end of the first elastic piece away from the at least one ratchet tooth is connected to the limiting structure.

6. The trigger module with force feedback as described in claim 1, wherein the upper part of the ratchet wheel comprises a toothed structure engaged with the trigger swing bar.

7. The trigger module with force feedback as described in claim 1, wherein the trigger swing bar comprises:
a trigger detachably engaged with the one-way transmission module,
a connecting shaft comprising an end mounted to the housing and another end connected to the trigger, and
a second elastic piece sleeved on a periphery of the connecting shaft,
wherein the second elastic piece is arranged at the housing and configured to provide an elastic force to reset the trigger.

8. The trigger module with force feedback as described in claim 7, wherein the trigger comprises:
a connecting part engaged with the one-way transmission module, and
a pressing part connected to the connecting part,
wherein a side of the connecting part connected to the one-way transmission module is provided with a gear structure engaged with the one-way transmission module.

9. The trigger module with force feedback as described in claim 1, wherein the driving module comprises a worm wheel connected to the one-way transmission module and a worm connected to the worm wheel in a transmission way, wherein the worm and the worm wheel are arranged in the installation groove, and the worm penetrates the housing and then is connected to an output shaft of the driving member.

* * * * *